Dec. 11, 1962   R. L. WILCOX   3,067,701
APPARATUS FOR FORMING TUFTED PATTERNS
Filed July 31, 1959   7 Sheets-Sheet 1

INVENTOR.
ROGER L. WILCOX
BY
ATTORNEY

Dec. 11, 1962   R. L. WILCOX   3,067,701
APPARATUS FOR FORMING TUFTED PATTERNS
Filed July 31, 1959   7 Sheets-Sheet 4

INVENTOR.
ROGER L. WILCOX
BY
ATTORNEY

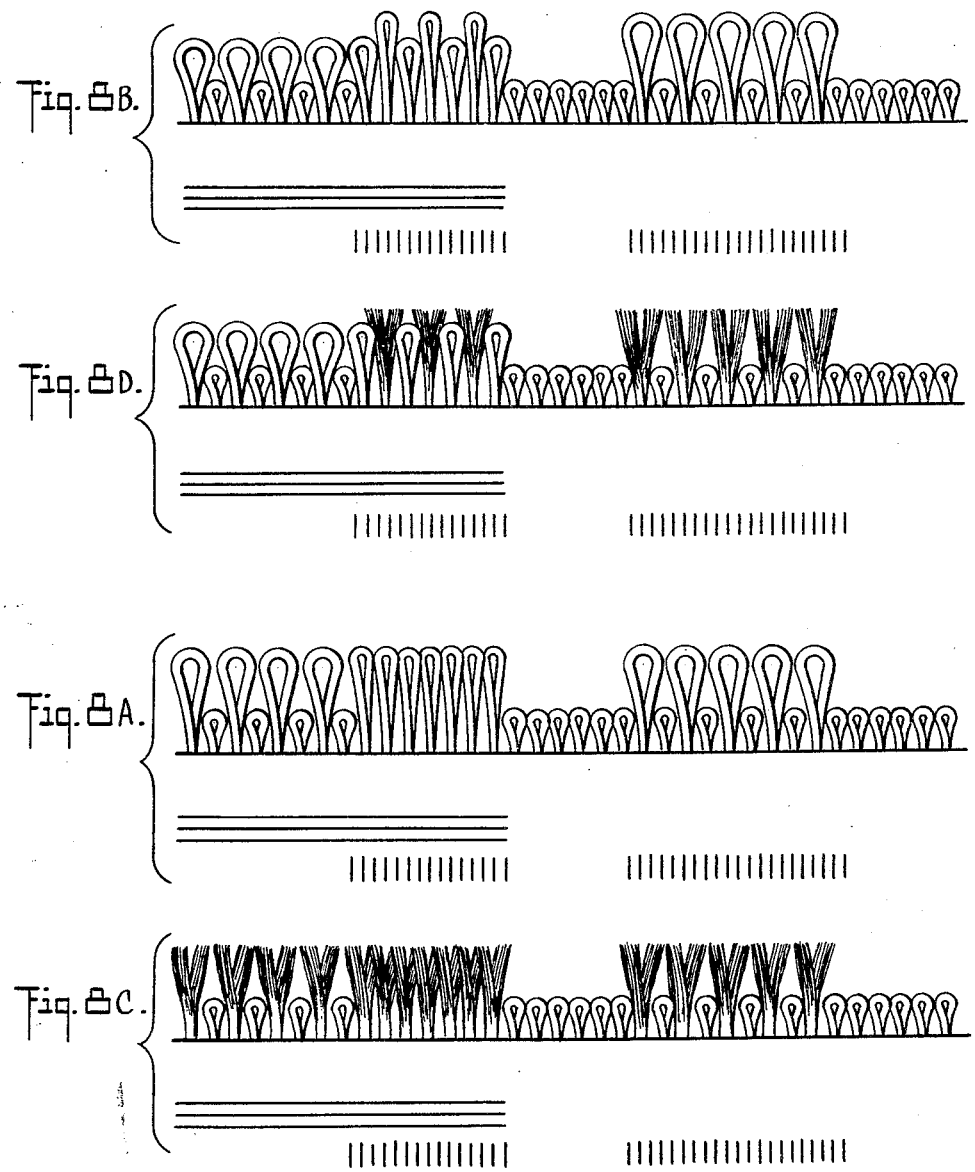

United States Patent Office 3,067,701
Patented Dec. 11, 1962

3,067,701
APPARATUS FOR FORMING TUFTED PATTERNS
Roger L. Wilcox, Amagansett, N.Y., assignor to A. & M.
Karagheusian, Inc., New York, N.Y., a corporation of
Delaware
Filed July 31, 1959, Ser. No. 830,848
3 Claims. (Cl. 112—79)

This invention relates to a tufting machine and a control system therefor.

One type of tufting machine in present use for the production of rugs and carpets called a "single needle control" or a "single end control" machine is capable of reproducing free-form or scroll type patterns in terms of high and low loops. The longer loops can be sheared on a standard shearing machine in order to obtain a fabric having cut and uncut pile areas.

The length of the loops to be formed in the pattern are controlled by a pattern control mechanism. For example, in one known form of control mechanism, a stencil of thin insulating material is fixed to the surface of a metal pattern drum which constitutes an element of a control circuit. Spaced laterally across the drum, in a straight line, are metal contact fingers corresponding to similarly spaced tufting needles on the machine. The drum is arranged to rotate so that its surface travels under the contact finger ends at the same rate as the backing or ground fabric travels under the tufting needles which form the loops of yarn in the backing material.

When the fingers are in contact with the surface of the drum, a circuit is established through an appropriate electrical system which, in turn, activates electromagnetic clutch mechanisms on corresponding yarn feed rollers. This action results in the feeding of less yarn to the needles so controlled and in shorter pile loops formed thereby. When any of the contact fingers are insulated from contact with the drum by a stencil element, the corresponding yarn feed rollers supply yarn to the needles at a preset rate such that longer loops are formed by the needles so controlled.

In the conventional tufting machine, the lateral dimension of the drum is equal to one lateral repeat of the pattern, and the circumference of the drum is equal to the length of one repeat (or two or more integral multiples). Therefore, a stencil pattern on the drum is a full scale pattern, which bears a one to one relation to the tufted fabric being produced on the machine. The only apparent exception occurs when the drive mechanism of the pattern drum is adjusted to rotate faster or slower relative to the feed of the backing fabric, thus compressing or stretching the length of the pattern of the fabric.

Each contact finger controls a separate yarn feeding roll which carries and feeds the yarn to the corresponding needle position in all of the repeats across the width of the machine. These yarn feeding rolls are arranged so that those feeding odd numbered needles are in one set, and those feeding even numbered needles are in another set. Thus, the yarn feed mechanism for odd numbered needles can be adjusted, within certain limits, independently of the feed mechanism for the even numbered needles.

With the present method of pattern control, however, the same pattern stencil controls the yarn fed to both odd and even needles equally. This means that the present pattern control method has limitations which naturally limit the patterns that can be produced. Specifically, the conventional control method is limited to two distinct elements, i.e., those representing areas of low loops caused by voids between stencils on the control drum, and those representing areas of high loops caused by the stencil elements on the control drum.

It is contemplated that the mechanism which controls either set of yarn feeding rolls can be independently adjusted so that the length of high loops for the set so adjusted is different from that of the other set.

It is the primary object of the invention to provide a pattern control arrangement which allows for the use of a pattern element to control the odd numbered needles separately from a second pattern element to control the even numbered needles, yet permitting perfect coordination of one with the other.

The invention is predicated on the concept that unlimited freedom of pattern control can be achieved by separately controlling the feed of yarn to the odd and even needle groups, respectively. It is, therefore, applicable to tufting machine controls of whatever nature so long as the control system is capable of modifications to separate the odd and even control functions. Since the invention was conceived while working with a pattern drum controlled carpet tufting machine, it will be described in relation to pattern drum control mechanism such that a concrete illustration may be provided for the purpose of illustrating the application of the invention.

When the pattern control method embodied in this invention is made operative on a presently available tufting machine, the former modes of operation and control are included in the improved more versatile control method herein.

Therefore the adaptation of a present tufting machine to the use of this invention provides greater flexibility of control in addition to all control functions formerly possible in the machine.

Thus, all types of fabrics formerly produced on the machine may still be produced with equal efficiency, as well as all the new types of fabrics made possible by the invention.

In addition, this invention makes provision for improved and easily prepared pattern control elements which can affect positive yet flexible control over the yarn fed to the needles of a tufting machine in any combination.

According to the specific illustrative embodiment, the invention contemplates preparation of pattern control stencils for any desired ultimate design in the fabric by tracing the contours representing areas of odd numbered high loops upon one stencil sheet, and similarly tracing contours representing areas of even numbered high loops onto another sheet. In those areas where both odd and even numbered high loop areas are intended to overlap, the contours representing such areas are duplicated on both stencil sheets.

The invention is conceived to be operative with presently available tufting machines after effecting only a minimum number of simple alterations therein. The only changes required in machines now available to adapt them to the use of the invention herein is the provision of a duplicate pattern element such that the control of the groups of odd and even ends can be separated one from the other. In pattern drum controlled machines this requires the provision of a duplicate pattern drum designed to rotate in unison with that now commonly installed in tufting machines; the removal of all even numbered contact fingers from the present drum, leaving all odd numbered fingers and associated electrical connections thereto unchanged; and the installation of the even numbered contact fingers and associated electrical connections on the second drum in proper sequence and position corresponding to the original sequence and position they occupied in respect to the original drum.

With two distinct loop lengths effective for odd numbered contact fingers and corresponding needles controlled by the first drum only, and two separately distinct loop lengths effective for the even numbered contact fingers and corresponding needles controlled by the second drum only, pattern control stencil sets conforming to any pattern design may be prepared and installed on the respective drums for reproduction into tufted fabrics having as many as four distinct surface areas, e.g., low odd loops adjacent to low even loops; high odd loops adjacent to low even loops; low odd loops adjacent to high even loops; and high odd loops adjacent to high even loops.

Where high pile is formed adjacent to low pile, whether in loop or cut form, the high pile will tend to cover the low pile. The extent of such coverage depends on the spacing of the tufts in both directions, the relative heights of pile in adjacent courses, and the character of the yarn, i.e., weight, twist, finish, etc.

With the invention herein and by proper selection of yarns and suitable control of other factors mentioned, the four characteristic design areas above enumerated may be emphasized or subdued relative to each other to create a variety of surface effects. For example, by adjustment of relative loop lengths between odd loops and even loops and by subsequent shearing, areas of cut pile may be produced which are distinct from areas of looped pile.

The foregoing discussion has dealt with the design potential of the invention in the production of monochrome effects; that is, both odd and even needles carrying yarn of the same color. With a conventional single drum, single stencil pattern control system, where odd and even ends are controlled equally, it is obvious that alternate color threading will result only in subtle stripe effects or in a third color effect resulting from the optical blending of two adjacent colors running through the pattern.

With the control technique of the present invention, utilizing two pattern control drums, each of which carries pattern elements controlling separately the odd and even ends, distinct two-color patterns are readily obtainable where alternate needles are threaded with yarn of different color. Because of the covering characteristic stated above, in areas of the pattern where odd pile are low and even pile are high, only the color of the high even pile will appear as a surface characteristic; by the same token, the reverse will be true where the odd pile and the even pile is reversed.

By suitable design of the pattern utilizing sheared effects as well as high loop areas, a variety of two-color design effects can be obtained. Furthermore, where low pile loops in adjacent courses are composed of yarn of different color, the proximity and intermixing of the two colors in the same surface plane, in effect, enhances the color pattern to the extent of producing an apparent third color element.

Although the outstanding objectives and advantages of the invention have been stated above, a reading of the following detail specification will show that the pattern variation in the ultimate fabric is limited only by the ingenuity of the pattern designer.

The drawings forming a part of this disclosure are intended to teach the principles of the invention as applied to a typical tufting machine and they are, therefore, of a diagrammatic nature. In these drawings like reference numerals indicate like parts, and, FIG. 1 is a front elevational view of a tufting machine;

FIGS. 8A, 8B, 8C and 8D represents variants of a profile section along line 8—8 of FIG. 4, together with a diagrammatic showing of horizontally represented control pattern elements of FIG. 5 and vertically represented control pattern elements of FIG. 6 by which formation of respective odd and even tufts are controlled.

Figure 1:
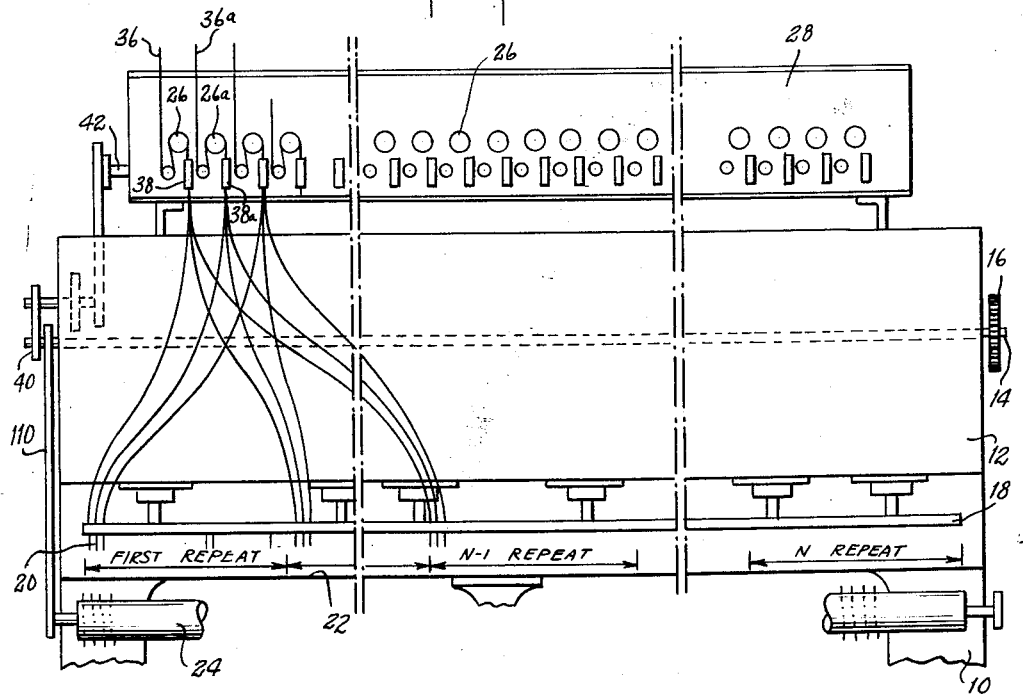

FIGURE 1 shows, in front elevation, a typical multi-needle tufting machine to which the control technique of the present invention is applicable. The machine includes a bed plate frame supported by legs 10. The length of the machine is determined by the width of the fabric to be produced therein and in the present instance, it will be assumed that the machine is of a width sufficient to make a floor size carpet fifteen feet in width, for example.

The legs 10 extend upwardly and support an upper frame or housing 12 within which is mounted a main shaft 14 which extends the full length of the machine and is mounted for rotation by power applied to a drive pinion 16 at one end thereof. The shaft 14 has associated therewith the necessary mechanism for raising and lowering a needle bar 18 such that needles 20 thereon are reciprocated into and out of a backing fabric which is passed over a bed plate 22. Also operated from the shaft 14, but not specifically shown herein, are the conventional loop hooks which engage the yarn as it is driven through the backing fabric and hold the same as the needles are withdrawn from the fabric.

The fabric forming the base in which the loops or tufts are formed is fed across the needle plate 22 by any convenient mechanism which may include feed rollers 24 having pins extending from the face thereof which penetrate the fabric and thus preclude the slipping of the fabric during the feeding thereof.

The tufting machine herein includes means for forming pile loops of different lengths in the base fabric, which loops are formed in different lengths by controlling the rate at which the yarn is fed to selected needle groups in a manner such that when it is desired to make short pile loops, the amount of yarn fed to selected groups of needles is reduced, and for the production of long loops it is increased. Accordingly, the tufting machine includes yarn feed rollers 26 through 26n which are positively driven and wherein such drive means for the yarn feed rolls includes a change speed mechanism by which selected rolls may be positively driven at different speeds. The drive means for the feed rollers is mounted in a casing 28, supported by the upper housing 12. The casing 28, as more specifically shown in FIG. 2, includes mechanism for differentially driving the several yarn feed rolls. Each of the yarn feed rolls 26 through 26n is carried at the forward end of a roll shaft 30. These shafts are journalled for rotation in the front and back wall of the casing 28. Each of the shafts 30 is controlled by an electromagnetic clutch mechanism, including a first clutch structure 32 and a second clutch structure 34. By this means, the yarn feed rolls may be differentially driven to control the amount of yarn fed to the respective needles.

Figure 2:
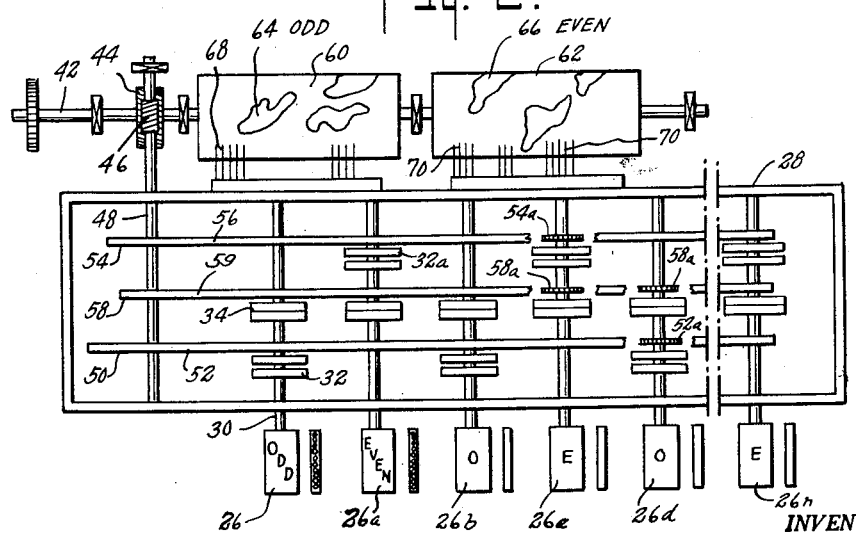
FIG. 2 is a plan view showing a system of yarn feed control rollers and a pair of pattern control drums.

Specifically, the feed rolls for the even numbered needles and those for the odd numbered needles are divided into distinct feed groups. In FIG. 2, it may be presumed that feed rollers 26, 26b and 26d control the feed of yarn to the first, third and fifth needle of each repeat needle group and that the feed rolls 26a, 26c and 26n control the feed of yarn to the second, fourth and sixth needle of each repeat needle group.

By reference to FIG. 1, it can be seen that the needles of the tufting machine are divided into a plurality of groups comprising the number of groups necessary for the pattern repeats of a fabric. Thus, each repeat from the first through n may consist of one hundred and fourteen needles which is an average number for producing an eighteen inch pattern repeat. The number of needles in each repeat may, of course, vary depending on the width of the repeat and the spacing of the needles on the particular machine.

As shown in FIG. 1, the yarn ends 36 for the first odd needle in each repeat is fed over its feeding roll 26 and through a yarn guide 38 from where individual ends are threaded through the first odd needle of each repeat group of needles. The yarn ends 36a for the first even needle of each repeat group is fed over the feed roll 26a, through its yarn guide 38a and from thence the individual ends are threaded through the first even needle of each repeat needle group. When all of the needles of the tufting machine are threaded as explained in respect to the first odd and first even needle, the corresponding ends of yarn of each repeat group can be individually controlled to form the same height pile loop at any given excursion of the needles.

Reverting to the roll drive control of FIG. 2, it should be noted that the feed rolls are so arranged that the odd rolls can be driven at a high speed to form long loops, that the even rolls can be driven at an intermediate speed such that loops of intermediate length are formed and that all of the rolls can be driven at low speed, such that all needles will form low loops.

The shaft 14 (FIG. 1) has a sprocket 40 which is connected to drive a pattern control shaft 42. As more particularly seen in FIG. 2, the shaft 42 has fixed thereto a worm gear 44 which engages a bevel gear 46 on a roll drive shaft 48 from which the several sets of yarn feed rolls are driven. At one end of the drive shaft 48 is a gear 50 which by way of a sprocket chain 52 and associated drive pinions 52a on the roll shafts, will drive the odd feed rolls 26, 26b and 26d, etc. Since the drive gear 50 has a relatively large diameter, it will drive the odd feed rolls at a relatively high speed and thereby provide yarn for the formation of long loops in the fabric. A second drive gear 54 through a drive chain 56 and associated drive sprockets 54a on the shafts of the even feed rolls 26a, 26c, etc., will drive these rolls. The drive gear 54 is somewhat smaller in diameter than the drive gear 50 with the result that when it is effectively coupled to drive the even feed rolls an amount of yarn will be fed to the even needles to produce looped pile of intermediate height. A small drive gear 58, its sprocket chain 59 and associated drive pinions 58a on each of the feed roll drive shafts will, when effectively coupled, drive all of the feed rolls at a relatively low speed and thereby provide yarn to produce low pile loops.

Whether the respective groups, i.e., odd or even of feed rolls are driven at high speed or low speed will depend on which of the two clutches in each roll system has been energized. For example, if the odd feed rolls are to be driven at high speed, the clutches 32 will be energized while the corresponding clutches 34 are deenergized. If the even feed rolls are to be driven at high speed, the clutches 32a will be energized while the corresponding clutches 34 are deenergized. On the other hand, if all of the feed rolls are to be driven at low speed, the clutches 34 which are common to all of the feed rolls will be energized while the high speed clutches 32 and 32a are deenergized.

Which of the clutch groups will be energized at any given time will be determined by the nature of the pattern control elements by which they are dominated. A variety of pattern control systems for tufting machines are used in the art at the present time, and others have been suggested which are easily modified according to the invention. According to the illustrative embodiment herein, the clutches are controlled by design pattern elements carried on physically separated pattern drum areas. Herein, for example, a pair of pattern drums 60 and 62 provide separate areas for elements of a pattern to be produced in the fabric. A single elongated pattern drum providing such separate pattern areas may be employed with equal results, as may, indeed, any pattern control mechanism in which the odd and the even end control can be separately achieved.

The pattern drum 60 carries thereon pattern elements 64 which are designed to control the pattern produced by the odd numbered needles while the pattern drum 62 carries thereon pattern elements 66 which are designed to control the pattern produced by the even numbered needles. Consequently, the pattern drum 60 has associated therewith a plurality of contact fingers 68 which correspond in number to the odd numbered needles in each repeat group of needles and which, therefore, represent the odd courses of loops produced in the fabric; and the pattern drum 62 has associated therewith a corresponding set of contact fingers which correspond in number to the even numbered needles in each repeat group of needles and which represent the even courses of loops produced in the fabric. The contact fingers represent any suitable mechanism by which a circuit may be completed. Thus, they may be electrical or mechanical. If electrical, they may be in the nature of brushes which pick up a charge either when they come into contact with the surface of the drum or, in the alternate, with the surface of the pattern control element. The contact fingers may be mechanical circuit control elements moved by relief or embossed pattern elements on the drum so that an electrical contact is closed or opened by them as they move in response to variations in drum surface.

The contact fingers 68 are respectively in control of the clutches 32 and 34 associated with the odd yarn feed rolls such that each contact finger 68 controls a high speed clutch 32 and a low speed clutch 34 associated with a respective odd yarn feed roll. In like manner, contact fingers 70 are respectively in control of the clutches 32a and 34 associated with the even yarn feed rolls such that each contact finger 70 controls a high speed clutch 32a and a low speed clutch 34 associated with a respective even yarn feed roll. For the purpose of example, it will be assumed that the drums themselves are in the clutch control circuit, and that the pattern elements on the surface of the drums will electrically insulate the fingers from the drums.

None of the contact fingers 68 and 70 shown in FIG. 2 are in engagement with a pattern element on their respective drums. As a result of the direct contact of the contact fingers with their respective drum surfaces, the low speed clutches 34 for all of the drive rolls are engaged and the high speed clutches thereof are disengaged.

Figure 3:
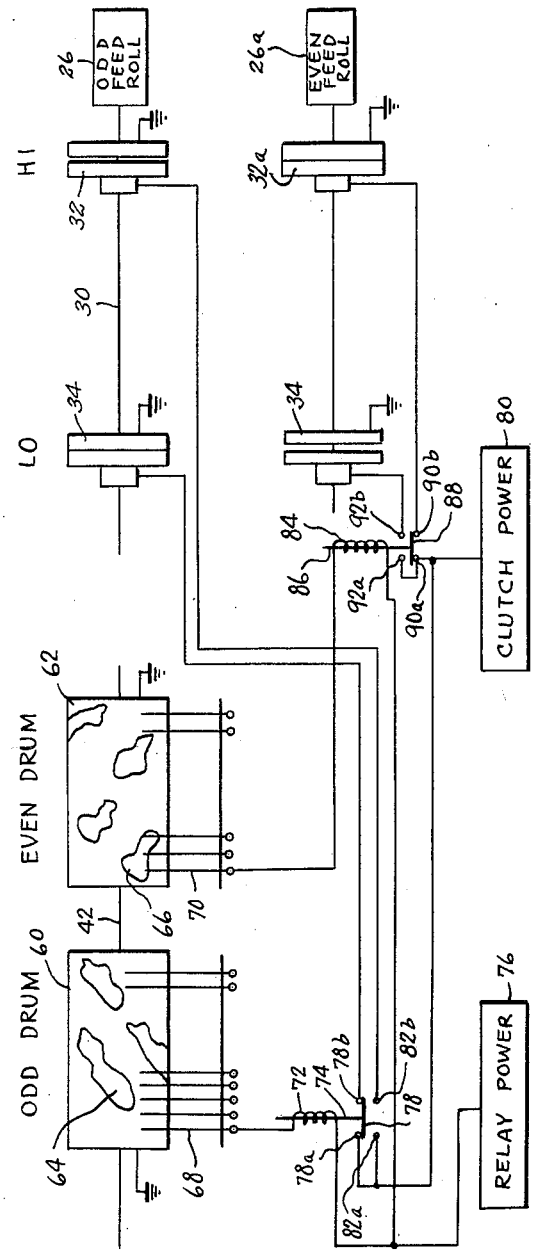
FIG. 3 is a schematic diagram showing how feed roll clutches are controlled from a pair of pattern drums.

The nature of a suitable control circuit can be determined by examining FIG. 3 in which a typical control circuit for an odd and an even feed roll is disclosed. All of the fingers 68 associated with the pattern drum 60 rest on the drum surface with the result that a circuit is established for the low speed clutches 34 controlling the odd feed rolls. From the first of the fingers 68, a circuit can be traced from the drum 60 through the finger 68 and through the now energized coil 72 of a relay 74 and from thence to a relay power source 76. A contact 78 of the relay 74 bridges contact points 78a and 78b such that a circuit is established from a clutch power supply 80 via the now closed relay points 78a and 78b and to the low speed clutch 34. This causes the clutch elements to engage whereby the feed roll shaft 30 now drives the odd feed roll 26 at a low speed. When the coil 72 of the relay 74 is deenergized by a break in the circuit when the finger 68 is insulated from the drum 60 by a pattern element 64, the relay contacts 78a and 78b will be opened and the related contacts 82a and 82b will be closed, whereby the clutch power supply 80 will be connected through the now closed relay contacts 82a and 82b to energize the high speed clutch 32. Opening of the relay points 78a and 78b will at the same time deenergize the low speed clutch 34.

The contact finger 70 which is the first contact finger on the even pattern drum 62 is insulated from the drum surface by the pattern control element 66 such that no circuit is established through the drum and with the result that a coil 84 of a relay 86 is deenergized. In this case, a contact 88 of the relay 86 closes contact points 90a and 90b thereby completing a circuit from the clutch power supply 80 via the now closed contact points 90a and 90b and to the high speed clutch 32a with the result that this clutch is energized and the even feed rolls 26a will be driven at high speed. When this circuit condition prevails, the relay points 92a and 92b associated with the relay 86 are open. Therefore, no circuit can be traced from the clutch power supply 80 to the low speed clutch 34 associated with the even feed roll 26a.

In the foregoing description, the pattern control mechanism is shown in the form of rotary drums 60 and 62. This, as stated, has been done merely for the purpose of illustration because the invention is based on the broad concept of separating the pattern control of the yarn feed to odd needles from that which is fed to the even needles by whatever mechanism is employed. Pattern drums, however, afford certain advantages over less sophisticated pattern control devices and the use of two pattern drums affords the distinct advantage that generation of the control patterns is simplified. These aspects of the invention will be appreciated by reference to FIGS. 4, 5 and 6.

Since some tufting machines in use today are controlled by a pattern drum, it is possible thereon to provide pattern control elements which segregate the odd-even control functions. Such an arrangement can be improvised with the present equipment by making the pattern stencil elements in narrow strips, each of which is in line with a separate contact finger. Although such method of preparing the pattern stencil can effectively separate the pattern control of odds from evens, it is not a preferred method because it would be a tedious and cumbersome task to register properly the narrow strips. Furthermore, it might introduce the danger of damage to such small control elements during normal operation of the machine. The invention, therefore, contemplates an improved technique for forming stencil elements which is rendered feasible by the spaced disposition of pattern control components on separate pattern drums or on separate areas of the same drum.

Figure 4:
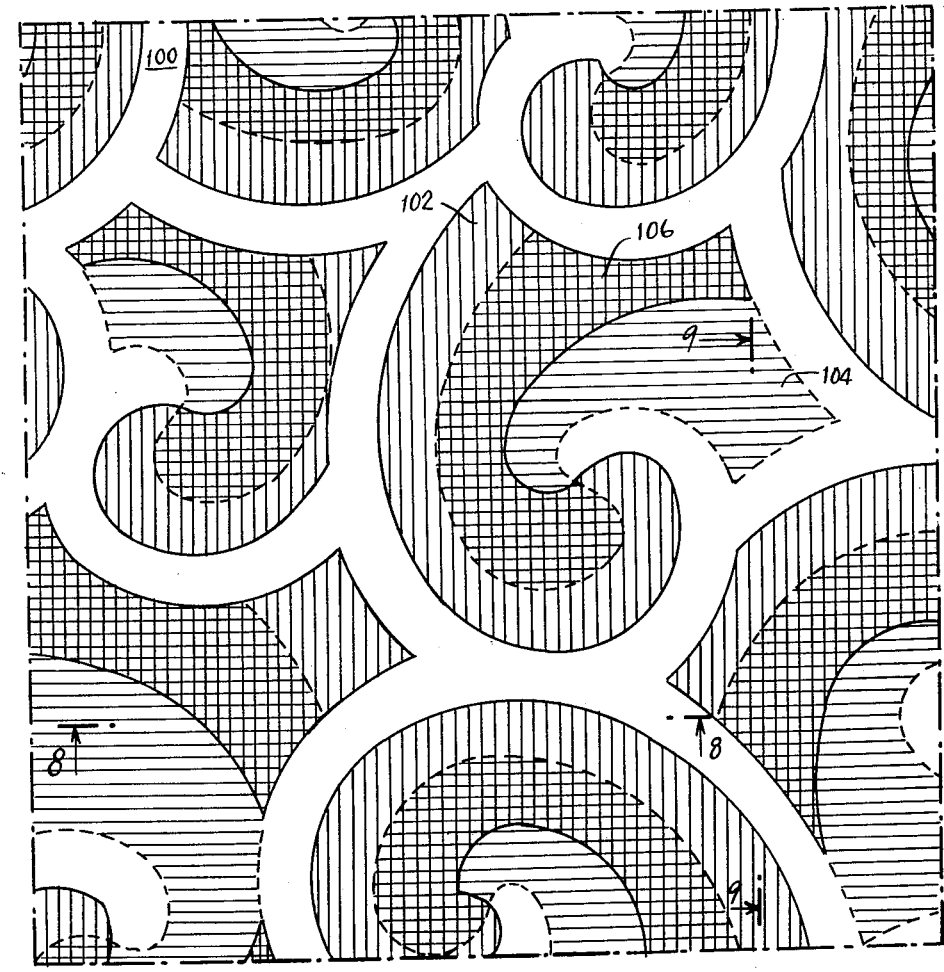
FIG. 4 represents a partial repeat of a figured tufted fabric wherein areas are shaded to indicate the presence of high, intermediate and low loops.

FIG. 4 represents a partial repeat of a fabric design in which certain portions comprise high even loops, high odd loops, and low odd and even loops. Thus, the unshaded areas 100 represent pattern configurations in which both the odd and the even loops are low such as would result from energizing all of the low speed clutches 34. Other areas 102 of the pattern, which are lined in the vertical direction, are formed of high even loops and low odd loops such as would be formed by energizing the clutches 32a of the even feed rolls and the clutches 34 of the odd feed rolls. Still other areas 104 of the pattern lined in the horizontal direction are formed of high odd loops and low even loops such as would be formed by energizing the clutches 32 of the odd feed rolls and the clutches 34 of the even feed rolls. The areas 106 of the pattern, which are lined both vertically and horizontally, represent areas formed of high odd and even loops, such as would be formed by energizing the clutches 32 of the odd feed rolls and the clutches 32a of the even feed rolls. It is apparent, therefore, that the control pattern can be reduced to two elements each having certain distinctive portions and certain portions in common with each other by simply tracing onto one control pattern the areas of the design in which the odd loops are to be high, as represented in FIG. 5, and tracing on a second control pattern the areas of the design in which the even loops are to be high, such as shown in FIG. 6.

Figure 7:
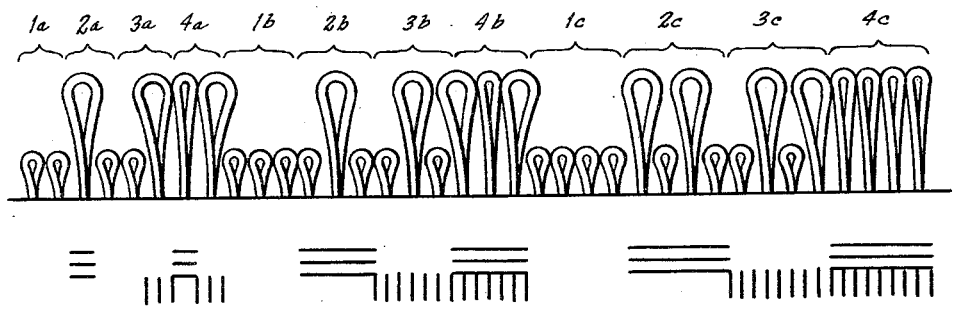
FIG. 7 represents profile sections of rows of tufts together with a diagrammatic representation of control pattern elements wherein the horizontal lines below the tufts indicate control pattern elements which control odd courses, and the vertical lines indicate control pattern elements which control even courses.

Segments 1a, 1b and 1c of FIG. 7 show that low odd loops adjacent to low even loops result from pattern voids. Segments 2a, 3a and 4a show pairs of odd and even courses and the minimum control pattern elements corresponding to the high loops in the segments. Segments 2b and 2c show that odd control pattern elements covering odd course positions and extending across adjacent even course positions effect only high odd loops adjacent to low even loops; and segments 3b and 3c show that even control pattern elements covering even course positions and extending across adjacent odd course positions effect only high even loops adjacent to odd low loops. Segments 4b and 4c show high odd loops adjacent to high even loops resulting from coincident odd and even control pattern elements.

Figure 5:
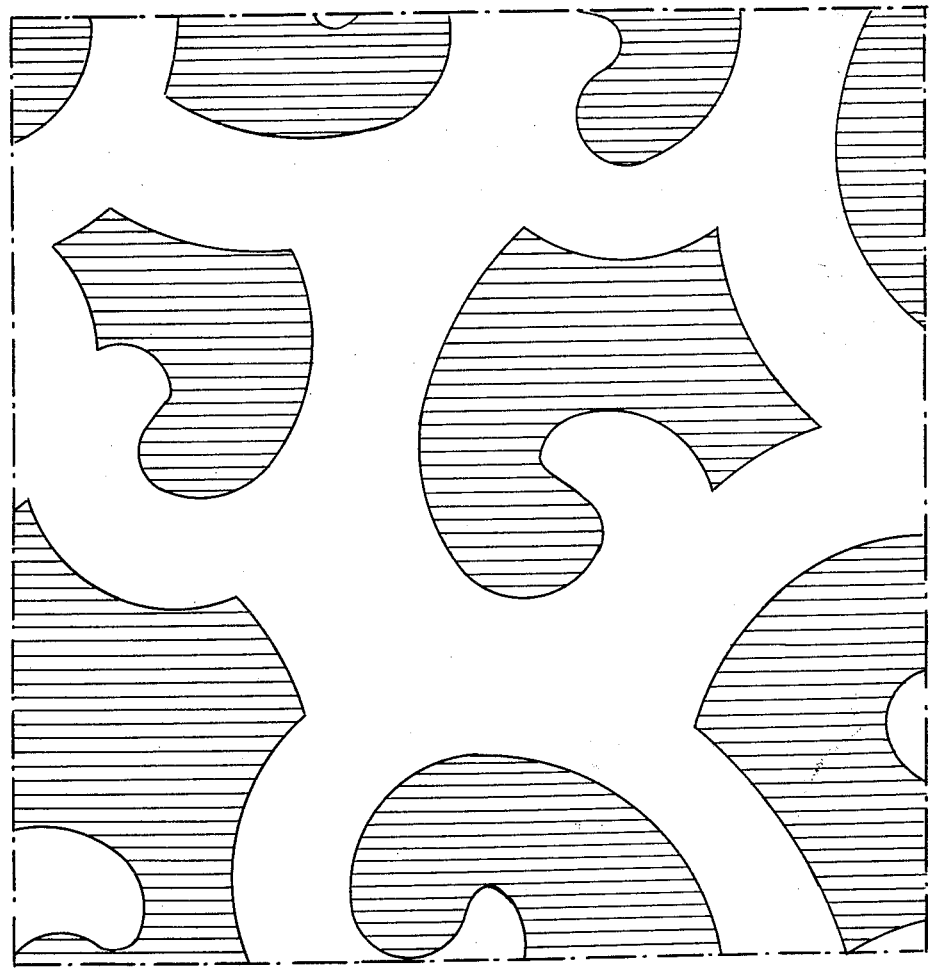
FIG. 5 illustrates a stencil element adapted to control the yarn ends fed to the odd numbered needles of the tufting machine.
Figure 6:
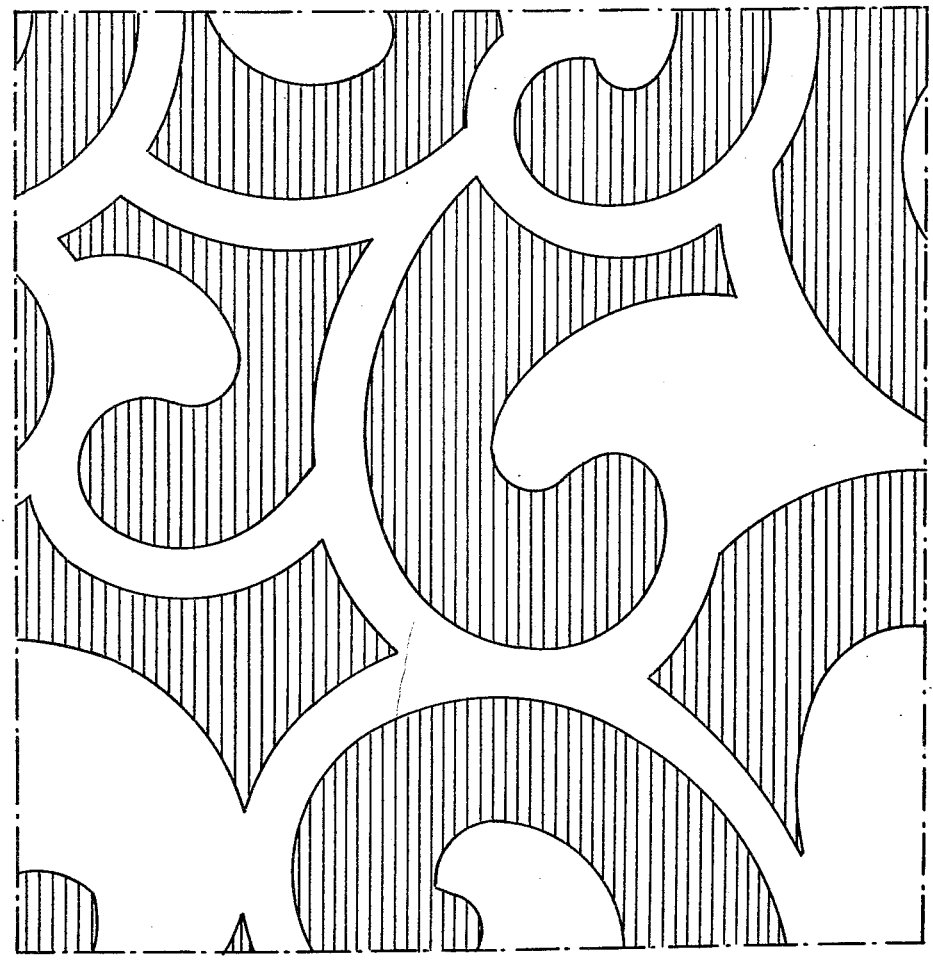
FIG. 6 illustrates a stencil for the control of the yarn ends fed to the even numbered needles.

The profile of FIG. 8A represents the combination of characteristic surface effects produced in the fabric when the feed roll sets in the tufting machine are adjusted so as to effect equal high loops and equal low loops in odd and even courses in response to respective control pattern elements as represented in FIGS. 4, 5 and 6. The profile of FIG. 8B represents the combination of characteristic surface effects produced in the fabric when the feed roll sets in the machine are adjusted so as to effect loops of intermediate height in the odd courses and high loops in the even courses in response to respective control pattern elements as represented in FIGS. 4, 5 and 6.

The profile of FIG. 8C represents the combination of characteristic surface effects produced in the fabric after shearing the fabric represented by the profile of FIG. 8A, and the profile of FIG. 8D represents the combination of characteristic surface effects produced in the fabric after shearing the fabric represented by profile 8B.

FIGS. 8A through 8D demonstrate that four monochrome fabrics, having distinctly different combinations of surface area effects may be produced from one design pattern by utilizing the principles of pattern control embodied in this invention. It is further demonstrable that four additional distinctly different fabrics may be produced from the same design pattern by using a first yarn type and/or color in odd courses and a second yarn type and/or color in even courses. Thus, it can be demonstrated that eight fabrics can be produced from the same design pattern, each distinctively different from the other in combinations of surface features according to feed roll adjustments adapted to produce the profiles of FIGS. 8A and 8B; by choice of shearing to produce the profile effect of FIGS. 8C and 8D; and by the selection and arrangement of two yarns to produce the configurations of FIGS. 8A through 8D.

If the design of FIG. 4 is produced by employing a first yarn type and/or color R in the odd courses and a second yarn type and/or color K in the even courses, regardless of whether the conditions of FIGS. 8A through 8D have been satisfied, the tone or color R will dominate and appear as a distinctive surface feature in the areas of the pattern typified by the structure 104; in areas typified by the structure 102, the tone or color K will dominate and appear as a distinct surface feature; while in the areas 106, a third tone or color will be apparent due to optical blending of the tones or colors R and K and similar blending will occur, to a more or less degree, in the areas 106.

It is conceivable that a multiplicity of yarn types and/or colors may be utilized to advantage in a specific design context and that they may be distributed across the width of the machine in any arrangement whatever. For usual design effects, however, the described use of two yarn types and/or colors illustrates the principle involved in relation to other characteristics of surface effect.

Figure 9:
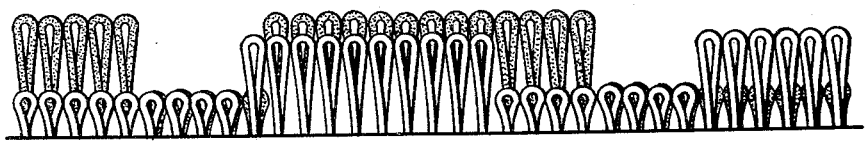
FIG. 9 is a course or warp-wise profile section on line 9—9 of FIG. 4, wherein the odd course b—b is shown in the foreground and the even course c—c is shown in the background.

FIG. 9 represents a profile section produced under the conditions corresponding to those of FIG. 8B. The view shows the odd course b—b of FIG. 4 in the foreground and the even course c—c in the background. The loops comprising the even course c—c are shown in solid line for clarity of presentation and to indicate the instance where a second yarn type and/or color is used.

From the foregoing exposition and by an examination of FIGS. 4 through 9, it is evident that while all four of the characteristics represented in FIG. 7 may be effectively employed in a given single fabric in many combinations, resort may be had to simpler combinations to form other fabrics or design effects including plain low loop monochrome fabrics, all with equal efficiency.

With the elements of the design separated as above described, one element is attached to or reproduced on one pattern drum or drum area, and the other element is attached to or reproduced upon the second pattern drum or drum area. In the example under consideration, the elements of FIG. 5 may be attached to or reproduced on the surface of the pattern control drum 60, while the elements of FIG. 6 may be attached to or reproduced on the surface of the pattern drum 62.

With the elements of the pattern incorporated in a pair of separate and distinct pattern control mechanisms, the composite fabric design, as shown in FIG. 4, for example, will be produced without further regard to control of the machine since the various related machine elements are synchronously operated.

When power is applied to the drive gear 16, the main drive shaft 14 will be rotated and from this shaft is driven the needle bar 18 to reciprocate the needles into and out of the ground fabric which is fed across the needle bed 22 by means of feed roller 24 driven from the main shaft 14 by means of a sprocket 110. At the same time, the main drive shaft 14 imparts power to the pattern drum control shaft 42 on which the pattern drums 60 and 62 are fixed for rotation in unison. Rotation of the feed roll shafts 30 is synchronized with the pattern control drums 60, 62, with the needle bar and with the ground fabric feed by reason of a direct drive connection between the drum shaft 42 and the main roll drive shaft 48. As the mechanism operates, the successive pattern elements on the drums 60 and 62 will alternately make and break clutch control circuits by way of the fingers 68 and 70, as described above, to regulate the speed of the odd feed rolls at one high ratio, the speed of the even feed rolls at the same high ratio or at a different high ratio, depending on the selected size of drive gears 50 and 54 respectively, and the speed of all of the feed rolls at the same low ratio depending on the nature of the design that is to be tufted into the fabric and as determined by the simple but separate pattern mechanism.

It will now be appreciated that the invention herein effectively and in a practical way extends the limitations of design potential from two elements of surface effect to four or more elements of surface effect; that it extends the limitations of design potential from monochrome or duochrome color effects to embrace a wide variety of effects and patterns in color; that it extends the design potential from two level relief pattern and texture effects to include a greater number of level relief pattern and texture effects with two or more color effects in the same design; that it provides for control stencils that are easily prepared from appropriate designs by familiar techniques; that it requires only minor changes in and additions to existing electromechanical tufting machine control systems; and that it provides, for the first time, means for producing rugs and carpets in tufting machines that can have a variety of surface effects heretofore possible only by the use of Wilton-Jacquard looms.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. A machine for producing a tufted fabric having a design unit, of predetermined area, presenting a design produced by pile height differences, comprising the combination of a first control pattern presenting a continuous surface of an area representative of the full area of the design unit and having actuating surface portions determinative of pile height in predetermined tufts throughout the design area, a second control pattern presenting a continuous surface of an area which is substantially the same as the surface area of the first control pattern and representative of the full area of the design unit and having actuating portions determinative of pile height in other predetermined tufts throughout the design area, a multiplicity of needles comprising a needle bank, means for feeding yarn to alternate needles in the needle bank, means for feeding yarn to the remaining needles between said alternate needles in the needle bank and independently of said first feeding means, a low speed drive, an intermediate speed drive and a high speed drive, means controlled by the said first pattern selectively to engage said low and said high speed drives with said first yarn feeding means to vary the height of pile loops formed by said alternate needles between low loops and high loops, and means controlled by said second pattern selectively to engage said low and said intermediate speed drives with said second yarn feeding means to vary the height of pile loops formed by said remaining needles between low loops and intermediate loops.

2. A machine for producing a tufted fabric having a design unit, of predetermined area, presenting a design produced by pile height differences, comprising the combination of a control drum pattern having a cylindrical surface area representative of the full area of the design unit and having actuating surface portions determinative of pile height in predetermined tufts throughout the design area, a second control pattern having a cylindrical surface area which is substantially the same as the surface area of the first control pattern and having actuating portions determinative of pile height in other predetermined tufts throughout the design area, a multiplicity of needles comprising a needle bank, means for feeding yarn to alternate needles in the needle bank, means controlled by the said first pattern to vary the rate of yarn feed to said alternate needles to vary the height of pile loops formed thereby between low loops and high loops, means for feeding yarn to the remaining needles between said alternate needles in the needle bank independently of said first feeding means and means controlled by said second pattern to vary the rate of yarn feed to said remaining needles to vary the height of pile loops formed thereby between low loops and high loops.

3. A machine for producing a tufted fabric having a design unit, of predetermined area, presenting a design produced by pile height differences, comprising the combination of a control drum pattern having a cylindrical surface area representative of the full area of the design unit and having actuating surface portions determinative of pile height in predetermined tufts throughout the design area, a second control pattern having a cylindrical surface area which is substantially the same as the surface area of the first control pattern and having actuating portions determinative of pile height in other predetermined tufts throughout the design area, a multiplicity of needles comprising a needle bank, means for feeding yarn to alternate needles in the needle bank, means controlled by the said first pattern to vary the rate of yarn feed to said alternate needles to vary the height of pile loops formed thereby between low loops and high loops, means for feeding yarn to the remaining needles between said alternate needles in the needle bank independently of said first feeding means and means controlled by said second pattern to vary the rate of yarn feed to said remaining needles to vary the height of pile loops formed thereby between loops of the same height as said low loops and loops of a height intermediate the heights of said high loops and said low loops.

(References on following page)

References Cited in the file of this patent

UNITED STATES PATENTS

| | | | |
|---|---|---|---|
| 876,562 | Kleutgen | Jan. 14, | 1908 |
| 2,028,872 | Kellogg | Jan. 28, | 1936 |
| 2,862,465 | Card | Dec. 2, | 1958 |
| 2,875,714 | Nix | Mar. 3, | 1959 |
| 2,876,441 | Boyles | Mar. 3, | 1959 |
| 2,884,881 | Oberholtzer | May 5, | 1959 |
| 2,954,865 | Hackney et al. | Oct. 4, | 1960 |
| 2,966,866 | Card | Jan. 3, | 1961 |
| 3,001,388 | MacCaffray | Sept. 26, | 1961 |

FOREIGN PATENTS

| | | | |
|---|---|---|---|
| 735,019 | Great Britain | Aug. 10, | 1955 |